(12) United States Patent
Paruchuri et al.

(10) Patent No.: US 8,828,518 B2
(45) Date of Patent: Sep. 9, 2014

(54) DECORATED TRIM ELEMENT

(75) Inventors: Sreenivas Paruchuri, Dusseldorf (DE); Stephan Wolf, Kempen (DE); Paul Angenheister, Kempen (DE); Vassilios Maniatopoulos, Burscheid (DE); Patrick Geurts, Wertach (DE); Leonidas Kiriazis, Munster (DE)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 766 days.

(21) Appl. No.: 12/065,733

(22) PCT Filed: Sep. 11, 2006

(86) PCT No.: PCT/EP2006/008829
§ 371 (c)(1),
(2), (4) Date: Aug. 18, 2008

(87) PCT Pub. No.: WO2007/028651
PCT Pub. Date: Mar. 15, 2007

(65) Prior Publication Data
US 2009/0130401 A1 May 21, 2009

(30) Foreign Application Priority Data
Sep. 9, 2005 (DE) .......... 10 2005 043 179

(51) Int. Cl.
*B32B 3/10* (2006.01)
*B32B 27/32* (2006.01)
*B32B 27/40* (2006.01)
*B60R 13/02* (2006.01)
*B32B 27/00* (2006.01)
*C09D 175/04* (2006.01)
*B32B 27/30* (2006.01)

(52) U.S. Cl.
CPC ............ *B60R 13/0243* (2013.01); *B60R 13/02* (2013.01); *B32B 27/00* (2013.01); *B32B 2605/003* (2013.01); *C09D 175/04* (2013.01); *B32B 27/30* (2013.01); *B32B 2274/00* (2013.01); *B60R 2013/0287* (2013.01)
USPC ........ 428/141; 428/220; 428/297.4; 428/523; 428/517; 428/424.4; 428/423.7; 264/241

(58) Field of Classification Search
USPC .............. 428/195.1, 412, 500, 424.8, 424.4, 428/304.4, 523, 339, 336, 141, 151; 525/240–243; 524/445, 515, 451
See application file for complete search history.

(56) References Cited

U.S. PATENT DOCUMENTS

| | | | | |
|---|---|---|---|---|
| 4,407,998 A | * | 10/1983 | Duvdevani | .................... 524/229 |
| 4,997,707 A | * | 3/1991 | Otawa et al. | ............... 428/319.3 |
| 5,709,925 A | | 1/1998 | Spengler et al. | |
| 6,001,455 A | * | 12/1999 | Nishio et al. | .................. 428/156 |
| 6,136,415 A | * | 10/2000 | Spengler | ....................... 428/157 |
| 6,379,802 B2 | * | 4/2002 | Ito et al. | ..................... 428/424.2 |
| 6,500,900 B1 | * | 12/2002 | Itoh | ................. 525/216 |
| 2002/0009598 A1 | * | 1/2002 | Lafave et al. | ................. 428/421 |
| 2004/0249080 A1 | * | 12/2004 | Shankernarayanan et al. | ............................ 525/192 |
| 2005/0194825 A1 | | 9/2005 | Kurz et al. | |

FOREIGN PATENT DOCUMENTS

| | | |
|---|---|---|
| DE | 198 34 199 | 2/2000 |
| EP | 0754740 A2 | 1/1997 |
| EP | 0 949 120 | 10/1999 |
| EP | 1 477 367 | 11/2004 |
| JP | 2-16345 U | 2/1990 |
| JP | 8300533 A | 11/1996 |
| JP | 11314328 A | 11/1999 |
| JP | 2002067202 A | 3/2002 |
| JP | 2003286058 A | 10/2003 |
| KR | 20010050216 A | 6/2001 |
| RU | 1796526 A1 | 2/1993 |
| SU | 657756 A3 | 4/1979 |

OTHER PUBLICATIONS

NIST Webbook. "Poly(methyl methacrylate)". webbook.nist.gov/cgi/cbook.cgi?ID=C87210320. retrieved Mar. 10, 2011.*
Whiteley et al. "Polyolefins". Ullmann's Encyclopedia of Industrial Chemistry, (2000); pp. 1-103.*

* cited by examiner

*Primary Examiner* — Prashant J Khatri
(74) *Attorney, Agent, or Firm* — Dickinson Wright PLLC

(57) ABSTRACT

A trim element for the passenger compartment of a motor vehicle, comprising a substrate and a film bonded to it, the film consisting of polypropylene (PP) or a polypropylene copolymer.

10 Claims, No Drawings

DECORATED TRIM ELEMENT

CROSS REFERENCE TO RELATED APPLICATIONS

None.

FIELD OF THE INVENTION

The present invention relates to a trim part for the interior of a motor vehicle, composed of a substrate and of a foil bonded thereto.

RELATED ART

The interior trim of motor vehicles is nowadays composed of a wide variety of moldings composed of a substrate which provides the appropriate dimensional stability of the molding and absorbs the mechanical forces arising. This substrate has often been laminated to a foil in order to increase the perceived visual quality of the interior of the motor vehicle. These foils were previously often relatively thick "in-mold-decoration" (IMD) foils, but these are comparatively expensive and/or not very scratch-resistant, and/or very glossy (with gloss levels greater than, for example, 10 or greater than 20, or greater than 30, as measured by VDA standard 621-409).

It is therefore one object of the present invention to provide, for the interior of a motor vehicle, a trim part which does not have the disadvantages of the prior art.

SUMMARY OF THE INVENTION

The object is achieved using a trim part intended for the interior of a motor vehicle, composed of a substrate and of a foil bonded thereto, the foil being composed of polypropylene (PP) or of a polypropylene copolymer.

It was extremely astounding and unexpected for the person skilled in the art that the inventive trim part can be produced and processed at comparatively low cost. The inventive trim part has high scratch resistance and can be provided with a wide variety of decorative effects.

DETAILED DESCRIPTION OF THE PREFERRED EMBODIMENTS

According to the invention, the molding or the substrate is coated at least on one side with the foil. The foil or coating foil used here comprises a foil whose thickness is at most 500 µm. The layer thickness of the foil is preferably less than 500 µm, particularly preferably less than or about equal to 400 µm, very particularly preferably less than or about equal to 300 µm, or in the range from about 300 µm to about 400 µm. This permits considerable cost savings on the entire component because considerably less material is used for the foil and because a lower-cost material and/or production process is used for the foil.

According to the invention, the foil may have on its side facing away from the substrate (visible side) a coating previously applied to the foil, or a layer of coating previously applied to the foil. This advantageously permits the appearance of the trim part on the side laminated to the foil (visible side) to be varied in a particularly simple manner, and to be adjusted by variation or adjustment of the coating or of the layer of coating.

According to the invention it is moreover preferable that the layer thickness of the layer of coating is from about 1 µm to about 30 µm, preferably from about 5 µm to about 20 µm, particularly preferably about 10 µm or preferably at most about 10 µm. The remaining thickness of the foil, which is preferably from a little less than 300 µm (if the total thickness of the foil is, for example, 300 µm) to a little less than 400 µm (if the total thickness of the foil is, for example, 400 µm) is preferably formed by a multilayer foil structure, i.e. by a foil structure with at least one layer and one further layer. As an alternative, the foil may be what is known as a monofoil. That means that the foil encompasses only one layer, which can be composed of a plurality of materials. The term monofoil also includes a foil which, although it comprises a plurality of layers, has identical material constitutions of these layers.

For production of the finished trim part, in particular motor vehicle trim part, this foil, including the coating, is bonded to a plastics backing or to the substrate. In one of the possible methods here, the foil together with the layer of coating is inserted in sheet form, i.e. flat, into a mold for the production of the trim part, and then, in a single production step using injection of a plastics material for production of the substrate, not only the plastics backing but also the foil together with the layer of coating are shaped, and during this shaping step what is known as a grain is produced simultaneously on the visible side of the coating or on the visible side of the foil, this grain generally being associated with differences in height of from about 0 µm to about 300 to 400 µm on the visible side of the surface of the trim part. As an alternative to this production procedure using a single shaping step not only to shape the foil but also to shape the plastics backing, it is also possible according to the present invention that the foil together with the coating is shaped in advance in a first shaping step and not bonded to the plastics material of the plastics backing until it reaches a second shaping step (in a second mold). The production process may be what is known as an in-mold-graining process (IMG process), which permits (but does not require) introduction of a grain into the layer of coating or into the foil layer of the trim part. This process can be either an injection-molding process or else a transfer-molding process.

When it is flat and directly converted to the final shape, heating of the foil can start prior to the forming step, so that forming of the foil is easier. A substantial advantage of the present invention is that when the material of the foil is brought together with the material of the substrate, no disruption of the foil occurs. The foil must nevertheless have this type of easy formability so that it also adapts to the fine features of the structure of the mold. In particular, it is important that, because of the low thickness of the foil, disruption of the foil is avoided during the introduction or enclosure of the plastics material (which is liquid and whose temperature is, for example, about 270° C.) for the backing, during injection molding. If the foil is thermoformed in a first step, i.e. preformed, and not converted to the final shape until it has reached a second forming step together with the plastics material of the backing, the heating of the foil does not generally begin prior to the second forming step. Nevertheless, here again consideration has to be given to sufficient stability of the foil, in particular when it is brought together with the backing material (which is in particular hot and under pressure). If the thermoforming procedure takes place in the first step of the process, the forming carried out is generally about 95% of the final extent of forming.

If the foil is formed in a single stage, trimming or edging generally takes place after the forming step. After the forming step here there may be a step in which the foil is cut, or the foil may be edge-folded. In the case of the two-stage production process (thermoformed foil in the first step of the process) the present invention allows a stamping step or a cutting step for the foil to take place between the first and the second forming step. In this case, no downstream working of the component is required after the second forming step. However, a cutting step or a stamping step can also be delayed until after the second forming step.

The demolding of the finished trim part with bonded foil on its visible side takes place in all of the forming steps using known technologies.

According to the present invention, a plurality of materials systems or combinations of materials systems can be used for the (vehicle) trim part. In a first combination of materials, the coating, or the layer of coating, provided on the visible side of the foil is a polyurethane coating, the multilayer foil is a polypropylene copolymer multilayer foil, and the plastics backing is a polypropylene plastics backing, if appropriate with fillers or reinforcing materials, such as fibers or the like, and the plastics backing here can also have been foamed. In the case of another combination of materials for the vehicle trim part, the layer of coating is likewise a layer of polyurethane coating, the foil is likewise a polypropylene copolymer multilayer foil, with a specific adhesion promoter, and the plastics material of the plastics backing is an ABS and/or PC material (ABS=acrylonitrile-butadiene-styrene, PC=polycarbonate). The backing material composed of polypropylene plastic and the backing material composed of ABS or PC plastic here are both commercially available plastics materials which by way of example have up to 30% of glass fibers and/or up to 30% of talc, where both of these added materials can theoretically have been added at up to 50%, and where the actual plastics content (i.e. the polypropylene content in the case of the plastics backing based on polypropylene or the ABS/PC content for the plastics backing based on ABS and/or PC) is always at least 50%.

According to the invention, it is therefore preferable that the layer of coating provided is polyurethane-based and preferably comprises a thermoplastics system or a reactive two-component polyurethane system, or that the layer of coating has high scratch resistance and/or high chemicals resistance and/or high UV resistance and/or high write resistance, or that the layer of coating is visually perceived as matt (surface with specific gloss levels in the sense of comparatively low gloss), and also moreover feels soft to the touch. Gloss is measured here by way of example to VDA 621-409, and according to the invention a gloss level of 0.5 or greater than 0.5 is achievable in particular, for example a gloss level of from about 0.5 to about 1.5, or a gloss level of from about 0.5 to about 4.0, or a gloss level of from about 1.5 to about 4.0. Scratch resistance is determined here by way of example using what is known as an Erichsen pen, and scratch resistances up to a load of up to 20 N are achievable according to the invention. As an alternative, scratch resistance is tested by what is known as the grid method, using color measurement of what is known as the delta L value (for a load of, for example, 5 N, 10 N, and 15 N). As another alternative, scratch resistance is determined by what is known as a five-finger test (using differently loaded pens from 2 N to 25 N), or to the manufacturer's standard BMW PA0015 or PA0016. According to the invention, forces that can be resisted (no visible surface damage revealing where the force was applied) are up to 7 N or else up to 15 N. Write resistance is determined according to the invention by way of example to one of the manufacturers' standards GM9150P (General Motors) or LP-463/PB-5401 (Chrysler). Chemicals resistance here is generally conventional chemicals resistance to a variety of manufacturers' standards, particularly with respect to gasoline, isopropanol, methanol, and a number of commercially available "car cleaners". According to the invention, it is particularly preferable that the gloss level of the surface of the finished trim part is below about 1.5 (for example to VDA 621-409), and that the scratch resistance of the surface is also at least, for example, about 10 N (by one of the abovementioned test methods).

The foil can be a single-layer foil (for example a polypropylene-based monofoil, whose production in particular either involves a single-layer foil throughout or involves producing the foil from a plurality of (similar) layers, or else can be a multilayer foil (meaning that in this last case the foil has at least one layer and one further layer (different therefrom), with a total of, for example, three or five layers (excluding the exterior layer of coating)), where at least the one layer is composed of polypropylene. The further layer(s) preferably involve(s) thermoplastic materials, particularly preferably polystyrene (PS) or a PS copolymer, a polyolefin, a polyolefin copolymer, or a thermoplastic elastomer (TPE). Preferred thermoplastic elastomers are thermoplastic elastomers based on a styrene copolymer component (TPES), of ethylene/propyleneterpolymer/propylene (TPEV), of a copolyester (TPEE), or based on polyurethane (TPEU). The further layer most preferably involves a combination composed of at least two of the thermoplastic materials and/or thermoplastic elastomers mentioned.

The foil particularly—but not necessarily—has an outer layer composed of polyethylene terephthalate (PET), polymethyl methacrylate (PMMA), or polycarbonate (PC) or composed of a mixture composed of at least two of these components.

The respective layers of the foil can be bonded during coextrusion via suitable adhesion promoter layers. As an alternative to this, they are laminated together using an adhesive.

The foil preferably has a decorative layer, which is particularly preferably applied by a printing process.

One particularly preferred embodiment of the foil encompasses polypropylene, in particular PPH (polypropylene homopolymer) or PP copolymer. In order to achieve particularly good stability during in-mold coating by an injection-molding method, a polypropylene block copolymer (PPBC) with comparatively low melt index (MFI, melt flow index) of less than 1 g/10 minutes (230° C./2.16 kg) is used at least in one of the layers or further layers. Content of less than or equal to 30% of an elastic material is also present, thus giving the foil its formability or extensibility. By way of example, a thermoplastic elastomer is used for this purpose. The foil can moreover have small proportions (usually less than 15%) of additives, such as color pigments, fillers, stabilizers, processing aids, etc.

Production of the foil in particular uses what is known as the sleeve process for polishing of the foil. In this process, the polymer melt is, after discharge from a flat-film die, passed between a metal belt and a chill roll, thus obtaining the class A surface needed. The surface of the foil substantially determines the visual quality of the layer of coating to be applied to the foil. This method also improves mechanical properties, because of the low level of orientation and the low degree of crystallinity. In particular, this method improves thermoformability or formability, and gives the foil greater toughness.

The substrate of the molding according to the invention preferably involves a thermoplastic material which takes the form of a mat or, as an alternative thereto, which is processed in the form of a melt.

It is preferable that the material processed in the form of a melt is composed of polypropylene (PP), of acrylonitrile/butadiene/styrene (ABS), of a mixture composed of ABS and polycarbonate (PC), of polyamide (PA), or of a thermoplastic elastomer (TPE), or involves a thermoplastic elastomer based on natural rubber and/or polypropylene (PP). The material processed in the form of a melt is also preferably composed of a mixture composed of at least two of these materials.

It is particularly preferable that the material processed in the form of a melt comprises fillers. Examples of fillers are talc, chalk, and wollastonite. The material processed in the form of a melt can also have reinforcing materials, e.g. glass fibers, natural fibers, carbon fibers, or textile-type reinforcements, e.g. glassfiber mats, or natural-fiber mats, with the aim of increasing its mechanical stability. Other materials that are also preferably added to the material processed in the form of a melt are pore-forming, e.g. physical or chemical blowing agents, or gas-loaded elastomer beads.

The thermoplastic material in the form of a mat preferably comprises fibers, e.g. natural fibers, glassfibers, or carbon fibers, and a thermoplastic binder, such as polypropylene. The thermoplastic binder can be admixed in the form of fibers or powders with the other fibers.

The inventive trim part is produced, for example, by in-mold coating of the thermoplastic material using an injection-molding method, compression-molding method, or injection-compression-molding method. The in-mold coating by an injection-molding method is preferably effected as in DE 10 2005 039 600, the entire disclosure of which is hereby incorporated by reference.

Before bonding to the foil, the substrate in the form of a mat is preferably preheated and then bonded to the foil in a shaping mold by a compression-molding method or by an injection-compression-molding method.

The foil, preferably as a 2D foil, is optionally preheated or after prior shaping of the foil, for example by thermoforming, placed into the shaping mold and bonded therein to the substrate, for example by in-mold coating using an injection-molding method, a compression-molding method or an injection-compression-molding method. Prior to insertion of the foil into the shaping mold, it is, if appropriate, cut, for example stamped, to give a suitable outline shape.

The surface structure of the inventive trim part can be generated via an appropriate surface of the shaping mold. This can have either a polished surface or a textured surface, thus permitting production of trim parts with a smooth surface or with a grained surface.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A trim part for the interior of a motor vehicle, comprising:
 a substrate and a foil bonded thereto;
 said substrate including at least one of polypropylene, acrylonitrile/butadiene/styrene, polycarbonate, polyamide, thermoplastic elastomer, and natural rubber;
 said foil having a thickness of not greater than 500 micrometers and including a visible surface facing away from said substrate;
 said foil including a plurality of layers, wherein a first one of said layers includes a thermoplastic elastomer and polypropylene, the polypropylene is a polypropylene block copolymer and has a melt flow index of less than 1 g/10 minutes, and the proportion of the thermoplastic elastomer is less than or equal to 30%, based on the mixture of thermoplastic elastomer and polypropylene;
 said foil including a further layer in addition to said first layer, said further layer including at least one of polystyrene, polystyrene copolymer, polyolefin, polyolefin copolymer, styrene copolymer component, ethylene/propyleneterpolymer/propylene, copolyester, and polyurethane;
 said foil including an outer layer in addition to said first layer and said further layer, said outer layer including at least one of polyethylene terephthalate, polymethyl methacrylate, and polycarbonate;
 a coating layer applied to said visible surface of said foil, wherein said coating layer includes polyurethane and a thermoplastic different from the polyurethane;
 said coating layer has a thickness of 1 to 30 micrometers, a scratch resistance of from 2 N to 25 N, and a gloss level of 0.5 to 4.0; and
 the process of forming said trim part comprises the steps of:
 inserting said foil layers and said coating layer into a mold in sheet form,
 injecting a plastic material into said mold to provide said substrate,
 the injecting step including shaping said substrate together with said foil layers and said coating layer, and
 the shaping step including forming a grain presenting differences in height along said coating layer facing away from said substrate.

2. The trim part of claim 1, wherein at least two distinct layers of said foil are bonded to one another by an adhesion promoter.

3. The trim part of claim 1, wherein one of said layers of said foil is a decorative layer.

4. The trim part of claim 1, wherein said substrate takes the form of a mat.

5. The trim part of claim 1, wherein said substrate is processed in the form of a melt, and wherein said substrate includes at least one of polypropylene, acrylonitrile/butadiene/styrene, a mixture of polypropylene and acrylonitrile/butadiene/styrene, polyamide, and thermoplastic elastomer.

6. The trim part of claim 5, wherein said substrate comprises fillers.

7. The trim part of claim 4, wherein said substrate comprises fibers and/or a binder.

8. The trim part of claim 1, wherein said thickness of said foil is in the range of about 300 μm to about 400 μm.

9. The trim part of claim 1, wherein said thickness of said foil is less than or equal to about 300 μM.

10. The trim part of claim 1, wherein the injecting step includes bonding said foil to said substrate.

* * * * *